Sept. 16, 1958
H. A. LAZARUS
2,852,191
COSINE COMPUTING CIRCUIT
Filed March 13, 1956
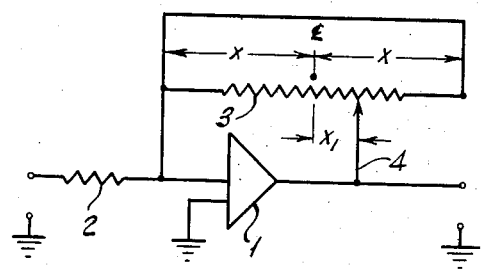
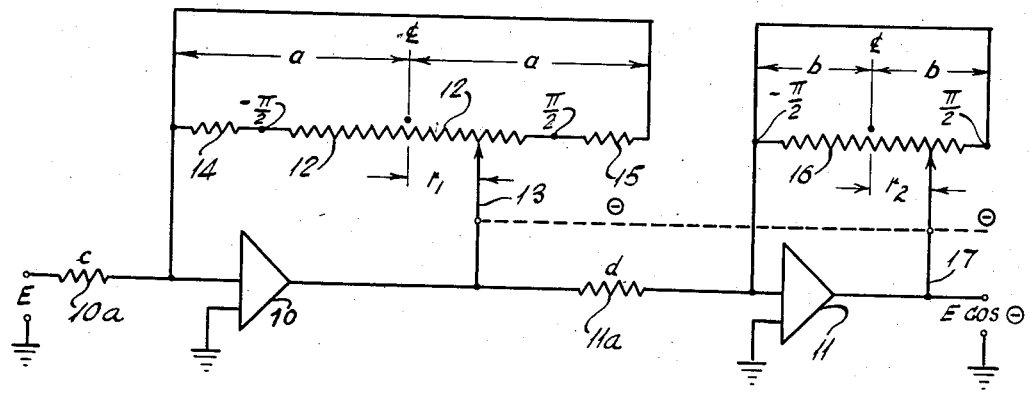
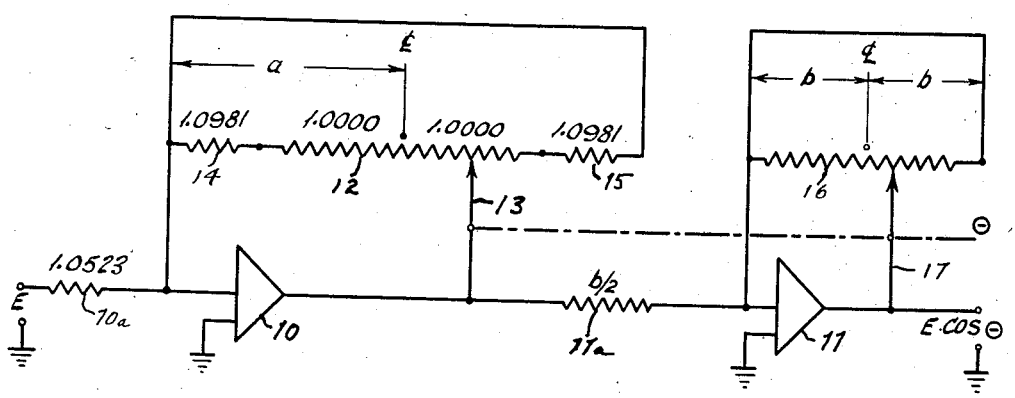
INVENTOR
HOWARD A. LAZARUS
BY
Burgess, Ryan & Hicks
ATTORNEYS

United States Patent Office 2,852,191
Patented Sept. 16, 1958

2,852,191

COSINE COMPUTING CIRCUIT

Howard A. Lazarus, Brooklyn, N. Y., assignor to Reeves Instrument Corporation, New York, N. Y., a corporation of New York Application March 13, 1956, Serial No. 571,180

4 Claims. (Cl. 235—61)

The present invention relates to an electronic computing circuit and it relates, more particularly, to a circuit for computing the cosine of an angle and the square of a quantity.

An object of the present invention is to provide a circuit for computing the cosine of an angle which may be readily used in connection with D.-C. computer applications. However, it will be understood that the present invention will also be applicable to other types of computers.

Another object of the present invention is to provide a cosine computing circuit that provides a high degree of accuracy and requires fewer components and thus, is less expensive than conventional cosine computing devices now available. The accuracy of the circuit, both theoretical and measured, embodying the present invention is better than 0.1 percent of the maximum amplitude of the cosine, over a range of from minus 90 degrees to plus 90 degrees.

Another object of the invention is to provide a computing circuit by means of which the square of a quantity is obtained using only one linear potentiometer and one summing amplifier.

Other objects and advantages of the invention will be apparent and will be best understood from the following description and the accompanying drawing, in which:

Fig. 1 is a schematic diagram of a computing circuit embodying the invention;

Fig. 2 is a schematic diagram of a cosine computing circuit embodying the invention; and Fig. 3 is a schematic diagram indicating the values of the resistances used in the cosine computing circuit of Fig. 2 in terms of ratios with reference to the respective potentiometer values.

In the circuit shown in Fig. 1, there is a high gain summing amplifier 1 which has a resistor 2 connected in series with the input and a feedback circuit which includes a potentiometer 3. A high gain amplifier is one that has a gain of five thousand or more and may be defined generally as an amplifier in which the reciprocal of the gain is less than the error in approximation caused by the finite gain. The end terminals of the potentiometer are connected to the input to the amplifier and the output of the amplifier is connected to movable contact arm 4 of the potentiometer. This provides a feed back circuit containing parallel branches, each of which includes a portion of the resistance of the potentiometer. Such a circuit enables the square of a quantity to be obtained. The gain K of the circuit may be expressed as:

$$K = -\frac{R_f}{R_i} \quad (1)$$

where $R_f$ is the feedback resistance and $R_i$ is the input resistance 2.

If the resistance of the potentiometer 3 is equal to $2X$ and the resistance between the movable contact arm and the center point of the potentiometer is $X_1$ then $$R_f = \frac{(X+X_1)(X-X_1)}{(X+X_1)+(X-X_1)} = \frac{X^2 - X_1^2}{2X}$$

if $X=1$ then $$R_f = \frac{1 - X_1^2}{2}$$

if $R_i = \frac{1}{2}$ then $$\frac{R_f}{R_i} = \frac{\frac{1-X_1^2}{2}}{\frac{1}{2}} = 1 - X_1^2$$

The circuit illustrated in Fig. 2 utilizes this principle for computing the cosine of an angle $\theta$.

In the circuit shown in Fig. 2, there are two stages each having a high gain feedback amplifier. The amplifier in the first stage is denoted by the numeral 10 while the amplifier of the second stage is denoted by the numeral 11. The amplifier 10 has a resistor 10a connected in series with its input and a feed back circuit which includes a potentiometer 12 connected to the output of the amplifier through a movable contact arm 13. Resistors 14 and 15 are preferably of the same value and have one end connected to each of the end terminals of the potentiometer and the other ends connected to the input of the amplifier, thus forming two parallel circuits connecting the output of the amplifier to the input.

The output of the amplifier 10 is connected to the input of the second amplifier 11 through a series input resistor 11a. The amplifier 11 also has a feedback circuit which includes a potentiometer 16 connected to the output of the amplifier through a movable contact arm 17. The end terminals of the potentiometer are connected to the input of the amplifier.

The movable contact arms 13 and 17 are movable together by means of a shaft, as indicated by the broken line, from a position of $\pi/2$ radians to a position of $-\pi/2$ radians or through a range of 180 degrees. Their movement by rotation of the shaft corresponds to the angle $\theta$, whose cosine is to be computed. When the potentiometers 12 and 16 are positioned for the cosine of 90° and —90°, the amplifier 11 has zero gain since the contact 17 of the potentiometer 16 is at one or the other of the end terminals. The total gain of the two stages may then be expressed as:

$$G = K_1 \cdot K_2 \quad (2)$$

Applying Equation 1, the gain $K_1$ of the first stage may be expressed as follows:

$$K_1 = -\frac{\frac{(a+r_1)(a-r_1)}{2a}}{c} = -\frac{\left[a + \frac{\theta \times 1}{\pi/2}\right]\left[a - \frac{\theta \times 1}{\pi/2}\right]}{2ac}$$

$$= -\frac{a^2 - \frac{\theta^2}{(\pi/2)^2}}{2ac} \quad (3)$$

where: $2a$ is the coefficient or scale factor of the resistance of the potentiometer 12 and the resistors 14 and 15 in the feedback circuit; $\theta$ is the angle in radians whose cosine is to be determined; $r_1$ is the coefficient or scale factor of the resistance between the contact arm and the midpoint of the potentiometer; and $c$ is the coefficient of the input resistor. These coefficients or scale factors are multipliers which when multiplied by the ohmic resistance of one-half of potentiometer 12 give the actual ohmic resistance values. Thus, the coefficient of the resistance of one-half of potentiometer 12 is unity.

Similarly, the gain $K_2$ of the second stage may be expressed as:

$$K_2 = -\frac{\frac{(b+r_2)(b-r_2)}{2b}}{d} = -\frac{\left[b + \frac{\theta \times b}{\pi/2}\right]\left[b - \frac{\theta \times b}{\pi/2}\right]}{2bd}$$

$$= -\frac{b\left[1 - \frac{\theta^2}{(\pi/2)^2}\right]}{2d} \quad (4)$$

where $2b$ is the coefficient of the resistance of the potentiometer 16; $r_2$ is the coefficient of the resistance between the contact arm and the mid-point of the potentiometer; and $d$ is the coefficient of the input resistor.

The total gain G will then be equation (3) multiplied by equation (4) and may be expressed as follows:

$$G = \frac{ba}{4cd}\left[1 - \frac{(a^2+1)\theta^2}{a^2(\pi/2)^2} + \frac{\theta^4}{a^2(\pi/2)^4}\right] \quad (5)$$

The series expansion of the cosine function for an angle $\theta$ is as follows:

$$\cos\theta = 1 - \frac{\theta^2}{2!} + \frac{\theta^4}{4!} - \frac{\theta^6}{6!} + \cdots \quad (6)$$

The similarity between Equation 5 and the first three terms of Equation 6 will be apparent from a comparison of the equations. It should also be noted that the coefficients $b$, $c$ and $d$ will simply determine scale factors that are used in the computation and do not enter into the evaluation of the cosine function. Thus, by properly selecting the value of the coefficient $a$ in Equation 5, that equation can be made to approximate the first three terms of the cosine expression as expressed in Equation 6 with a high degree of accuracy.

By calculation, it is theoretically possible to obtain an accuracy of better than ±0.1 percent. Such calculations involve solving the first three terms of the cosine expansion Equation 6 for the coefficients of the angle $\theta$ at 0, 1 and $\pi/2$ radians which are arbitrarily selected values and then determining a value of the coefficient $a$ so that the coefficients of $\theta$ in Equation 5 will most closely approximate the coefficients as calculated.

The following table shows the percent theoretical error in the cosine for several different values of the angle $\theta$ when computed in accordance with the equation $$G = \cos\theta = \frac{ba}{4cd}\left[1 - \frac{\theta^2}{2.0129} + \frac{\theta^4}{26.968}\right] \quad (7)$$

as compared with the true value of the cosine.

*Calculated error*

| $\theta$ | True Cos $\theta$ | Calculated Cos $\theta$ | Error | Percent Error |
|---|---|---|---|---|
| 0° | 1.00000 | 1.00000 | 0 | 0 |
| 30° | 0.86603 | 0.86659 | +.00056 | +.056 |
| 45° | 0.70711 | 0.70760 | +.00049 | +.049 |
| 60° | 0.5000 | 0.49980 | −.00020 | −.02 |
| 70° | 0.34202 | 0.34111 | −.00091 | −.091 |
| 80° | 0.17365 | 0.17241 | −.00124 | −.124 |
| 90° | 0.0000 | 0.00000 | 0 | 0 |

The maximum spread of the percent error is 0.18 percent and splitting this, the maximum error is less than ±0.1 percent.

However, in order to determine the optimum value of the coefficients of $\theta$, a test circuit using the calulated values may be operated to compare the values of the cosine obtained with the actual values of the cosine over the range of values for the angle $\theta$. As a result of such a comparison it is then possible to adjust the value of the quantity $a$ to obtain more accurate results over the active range of $\theta$ from +90 degrees to −90 degrees. If desired, the coefficients to obtain an even maximum error split on either side of zero may be computed mathematically in accordance with the Tchebicheff polynominal equation.

From actual tests it was found that the coefficients for the angle $\theta$ are more accurately expressed by the following equation:

$$G = \cos\theta = \frac{ba}{4cd}\left[1 - \frac{\theta^2}{2.0106} + \frac{\theta^4}{26.800}\right] \quad (8)$$

Comparative tests made using the coefficients of Equation 8 in the computing circuit gave the following measured error at various values of the angle $\theta$:

*Measured error*

| $\theta$ | Percent Error | |
|---|---|---|
| | Run 1 | Run 2 |
| 0° | 0.02 | 0.01 |
| 30° | 0.025 | 0.0 |
| 45° | 0.10 | 0.08 |
| 60° | 0.08 | 0.08 |
| 70° | 0.0 | 0.02 |
| 80° | −0.03 | −0.01 |
| 87° | −0.05 | −0.03 |
| 90° | 0.0 | 0.0 |

In Fig. 3 the optimum relative values of the several resistances used in the first stage of the cosine computer are indicated. The illustrated arrangement contemplates the employment of a potentiometer 12 wherein the entire travel of the contactor 13 is utilized to cover a cosine range of $\pi/2$ radians to $-\pi/2$ radians. From the foregoing equations it is evident that $r_1$ for $\pi/2$ and $-\pi/2$ must be less than the value $a$ and therefore the fixed end resistors 14 and 15 are required to couple the ends of the potentiometer to the input of amplifier 10. The actual values of resistors 14 and 15 can be readily determined, after the computation of the relative values of $a$ and $c$ as above described by utilizing Equation 3 to compute the gain of the first stage at $\pi/2$ or $-\pi/2$ and then solving for $r_1$ in the equation:

$$K_1 = \frac{\frac{(a+r_1)(a-r_1)}{2a}}{c}$$

Inasmuch as the absolute resistance value of the potentiometer 12 and resistors 14, 15 and 10a may be varied over wide limits, the optimum values of resistors 14, 15 and 10a are given in terms of the resistance of one half the potentiometer 12. Thus, resistors 14 and 15 are each proportional to 1.0981 times the resistance of ½ the potentiometer, and resistor 10a is proportional to 1.0523 times the resistance of ½ the potentiometer.

The circuits illustrated in Figs. 2 and 3 are set up to compute the cosine of the angle $\theta$ over a range of minus 90 degree to plus 90 degrees and hence, the potentiometers need not be capable of 360 degrees of mechanical rotation.

However, if desired, the cosine of the angle $\theta$ over a range of 360 degrees may be computed by using a potentiometer capable of 360 degrees of mechanical rotation, with the input to the potentiometer being geared so that 180 degrees for the angle $\theta$ is equal to 360 degrees of potentiometer rotation, and by switching the polarity of the input voltage at the plus and minus 90 degree positions of the potentiometer.

It will be understood that various changes and modifications may be made in the embodiment of the invention illustrated and described herein without departing from the scope of the invention as defined in the following claims.

I claim:

1. A circuit for computing the cosine of the angular position of a shaft which comprises a pair of high-gain amplifiers having inputs and outputs and feedback circuits associated therewith, each of said feedback circuits including a linear potentiometer having a resistance element and a movable contact arm engaging said element, means conductively joining one end terminal of said resistance element to the other end terminal, said joined end terminals and said contact arm being connected between the output and the input of the respective amplifiers, each of said amplifiers having an input resistor connected to the input thereof, with the output of one of said amplifiers being connected to the input of the other amplifier through the input resistor of the other amplifier, and shaft means for simultaneously varying the resistance of said potentiometers in the respective feedback circuits.

2. A circuit for computing a cosine comprising a first amplifier having an input and output, a potentiometer having a pair of end terminals and a movable contact, a connection between said movable contactor and the output of said amplifier, a pair of resistors each connected between one end terminal of the potentiometer and the input of said amplifier, means including a series resistor for applying a signal to the input of said amplifier, a second amplifier having an input and output, a second potentiometer having a pair of end terminals and a movable contactor, a connection between the last said contactor and the output of the second amplifier, connections between each of the end terminals of said second potentiometer and the input of said second amplifier, a series resistor coupling the output of said first amplifier with the input of said second amplifier and means for simultaneously varying the contactors of both potentiometers.

3. A circuit for computing a cosine as defined in claim 2 wherein each of said pair of resistors has a value approximately equal to 1.0981 times the resistance of one-half the first potentiometer, the resistor in series with the input of the first amplifier has a value approximately equal to 1.0523 times the resistance of one-half the first said potentiometer, and the series resistance coupling said amplifiers is approximately equal to one quarter of the total resistance of said second potentiometer.

4. A cosine computing circuit comprising in combination, a first amplifier means having an input terminal and an output terminal, first linear potentiometer means having first and second fixed terminals and a movable contact, means coupling said movable contact to one of said terminals of said first amplifying means, fixed resistor means coupling said first and second fixed terminals to the other terminal of said first amplifier means, said first amplifier means further including a common terminal, first resistor means having one terminal coupled to the input terminal of said first amplifier means, said resistor means being adapted for receiving an applied voltage coupled between its other terminal and said common terminal, second amplifier means having an input terminal and an output terminal, second linear potentiometer means having first and second fixed terminals and a movable contact, means coupling the movable contact of said second potentiometer means to one of the terminals of said second amplifier means, means coupling the first and second fixed terminals of said second potentiometer means to the other terminal of said second amplifier means, second amplifier means further including a common terminal coupled to the common terminal of said first amplifier means, second resistor means having one terminal coupled to the input terminal of said second amplifier means and having its other terminal coupled to the output terminal of said first amplifier means, and shaft means intercoupling the movable contacts of said first and second potentiometers, said second amplifier means providing an output voltage between the output terminal thereof and said common terminal varying according to the product of an applied voltage and the cosine of the angular position of said shaft means.

References Cited in the file of this patent

UNITED STATES PATENTS

| | | |
|---|---|---|
| 2,444,770 | Flyer | July 6, 1948 |
| 2,621,275 | Nielson et al. | Dec. 9, 1952 |

OTHER REFERENCES

Electronic Engineering (Mynall), July 1947; page 214.
Electronic Instruments (Greenwood), 1948; page 139.